(12) United States Patent
Kanai

(10) Patent No.: US 8,721,245 B2
(45) Date of Patent: May 13, 2014

(54) PENETRATION LOAD REDUCED STAPLE

(75) Inventor: Toshiyuki Kanai, Tokyo (JP)

(73) Assignee: Max Co., Ltd., Tokyo (JP)

( * ) Notice: Subject to any disclaimer, the term of this patent is extended or adjusted under 35 U.S.C. 154(b) by 14 days.

(21) Appl. No.: 13/141,895

(22) PCT Filed: Dec. 24, 2009

(86) PCT No.: PCT/JP2009/071376
§ 371 (c)(1),
(2), (4) Date: Jun. 23, 2011

(87) PCT Pub. No.: WO2010/074111
PCT Pub. Date: Jul. 1, 2010

(65) Prior Publication Data
US 2011/0262247 A1    Oct. 27, 2011

(30) Foreign Application Priority Data
Dec. 25, 2008  (JP) ................ 2008-330606

(51) Int. Cl.
*F16B 15/00* (2006.01)

(52) U.S. Cl.
CPC .......... *F16B 15/0015* (2013.01); *Y10S 411/921* (2013.01)
USPC ............ 411/457; 411/456; 411/921

(58) Field of Classification Search
USPC ......... 411/471, 472, 487, 488, 921, 455, 456, 411/451.5, 460, 457
See application file for complete search history.

(56) References Cited

U.S. PATENT DOCUMENTS

| | | | | |
|---|---|---|---|---|
| 66,968 A * | 7/1867 | Kendig | ............ | 402/14 |
| 314,848 A * | 3/1885 | James | ............ | 428/223 |
| 1,022,745 A * | 4/1912 | Kurz | ............ | 292/316 |
| 1,206,425 A * | 11/1916 | Feasey | ............ | 411/472 |
| 1,510,360 A * | 9/1924 | Van Rijmenam | ............ | 281/50 |
| 1,574,790 A * | 3/1926 | Carroll | ............ | 16/444 |
| 1,852,060 A | 4/1932 | Peterson | | |
| 2,111,404 A * | 3/1938 | Pankonin | ............ | 411/444 |
| 2,208,842 A * | 7/1940 | Harvey | ............ | 206/340 |
| 2,807,185 A * | 9/1957 | Gaskill | ............ | 411/471 |
| 3,016,586 A * | 1/1962 | Atkins | ............ | 411/466 |
| 3,236,142 A * | 2/1966 | Bradway | ............ | 411/447 |
| 3,757,629 A * | 9/1973 | Schneider | ............ | 411/443 |
| 3,969,975 A * | 7/1976 | Krol | ............ | 411/456 |
| 4,014,244 A * | 3/1977 | Larson | ............ | 411/471 |
| 4,090,337 A * | 5/1978 | Szekeres | ............ | 52/309.1 |
| 4,635,637 A * | 1/1987 | Schreiber | ............ | 606/219 |

(Continued)

FOREIGN PATENT DOCUMENTS

| | | |
|---|---|---|
| JP | 61-57213 | 4/1986 |
| JP | 61-28700 | 8/1986 |

(Continued)

*Primary Examiner* — Victor Batson
*Assistant Examiner* — Caroline L Natirboff
(74) *Attorney, Agent, or Firm* — Drinker Biddle & Reath LLP

(57) ABSTRACT

A penetration load reduced staple includes a pair of leg portions configured to penetrate sheets of paper, a crown portion connecting the pair of leg portions. Each of the leg portions includes a protrusion protruding in a direction intersecting with a longitudinal direction of the leg portion, from a portion of a side surface of the leg portion between the crown portion and a distal end portion of the leg portion and near the distal end portion.

5 Claims, 7 Drawing Sheets

(56) References Cited

U.S. PATENT DOCUMENTS

| | | | | |
|---|---|---|---|---|
| 4,697,045 | A | * | 9/1987 | Beatty .......................... 174/159 |
| 5,223,675 | A | * | 6/1993 | Taft ............................. 174/159 |
| 5,718,548 | A | * | 2/1998 | Cotellessa .................. 411/456 |
| 6,056,183 | A | | 5/2000 | Tanabe |
| 6,698,640 | B2 | | 3/2004 | Hakozaki et al. |
| 7,021,512 | B1 | * | 4/2006 | Nakamura ..................... 227/76 |
| 2003/0021655 | A1 | * | 1/2003 | Correll et al. ............... 411/473 |
| 2006/0213951 | A1 | | 9/2006 | Yagi |
| 2006/0289599 | A1 | | 12/2006 | Yagi |

FOREIGN PATENT DOCUMENTS

| | | |
|---|---|---|
| JP | 02-060733 | 1/1990 |
| JP | 3050477 | 4/1998 |
| JP | 2004-276312 | 10/2004 |
| JP | 2007-519863 | 7/2007 |
| JP | 2009-063054 | 3/2009 |
| WO | 03/090975 | 11/2003 |

* cited by examiner

US 8,721,245 B2

PENETRATION LOAD REDUCED STAPLE

TECHNICAL FIELD

The present invention relates to a penetration load reduced staple by which a penetration load received when penetrating sheets of paper to be stapled is reduced.

BACKGROUND ART

A method for reducing a penetration load to be received when striking a staple is proposed (see, e.g., JP 2004-276312 A). According to this method, when stapling a plurality of sheets of paper, a penetration resistance at the time of striking the staple is reduced. Specifically, when stapling the sheets of paper duplicated or printed by an image forming apparatus, such as a copy machine, a printer, etc., a penetration resistance reducing agent is attached on a portion of the sheets of paper to be stapled, and then, the staple is struck into the portion of the sheets of paper to be stapled.

However, this technique requires an apparatus for attaching the penetration resistance reducing agent to the portion of the sheets of paper to be stapled, resulting in a cost increase. Thus, when binding sheets of paper having a high penetration resistance with a general stapler, a staple having a large wire diameter is used in view of reducing cost. In this case, to improve stiffness of the stapler, the entire size of the stapler is required to be increased. When using a staple having a large wire diameter in an electric stapler, power consumption increases.

SUMMARY

The present invention has been made in an effort to solve the problems described above and to provide a penetration load reduced staple capable of penetrating and binding sheets of paper having a high penetration resistance without strengthening the stiffness or the power of a stapler.

According to an aspect of the present invention, a penetration load reduced staple includes a pair of leg portions configured to penetrate sheets of paper, a crown portion connecting the pair of leg portions. Each of the leg portions includes a protrusion protruding in a direction intersecting with a longitudinal direction of the leg portion, from a portion of a side surface of the leg portion between the crown portion and a distal end portion of the leg portion and near the distal end portion.

Other aspects and advantages of the present invention will be apparent from the following description, the drawings, and the claims.

EMBODIMENTS OF THE INVENTION

Hereinafter, exemplary embodiments of the present invention will be described in detail with reference to the drawings.

Figure 1:
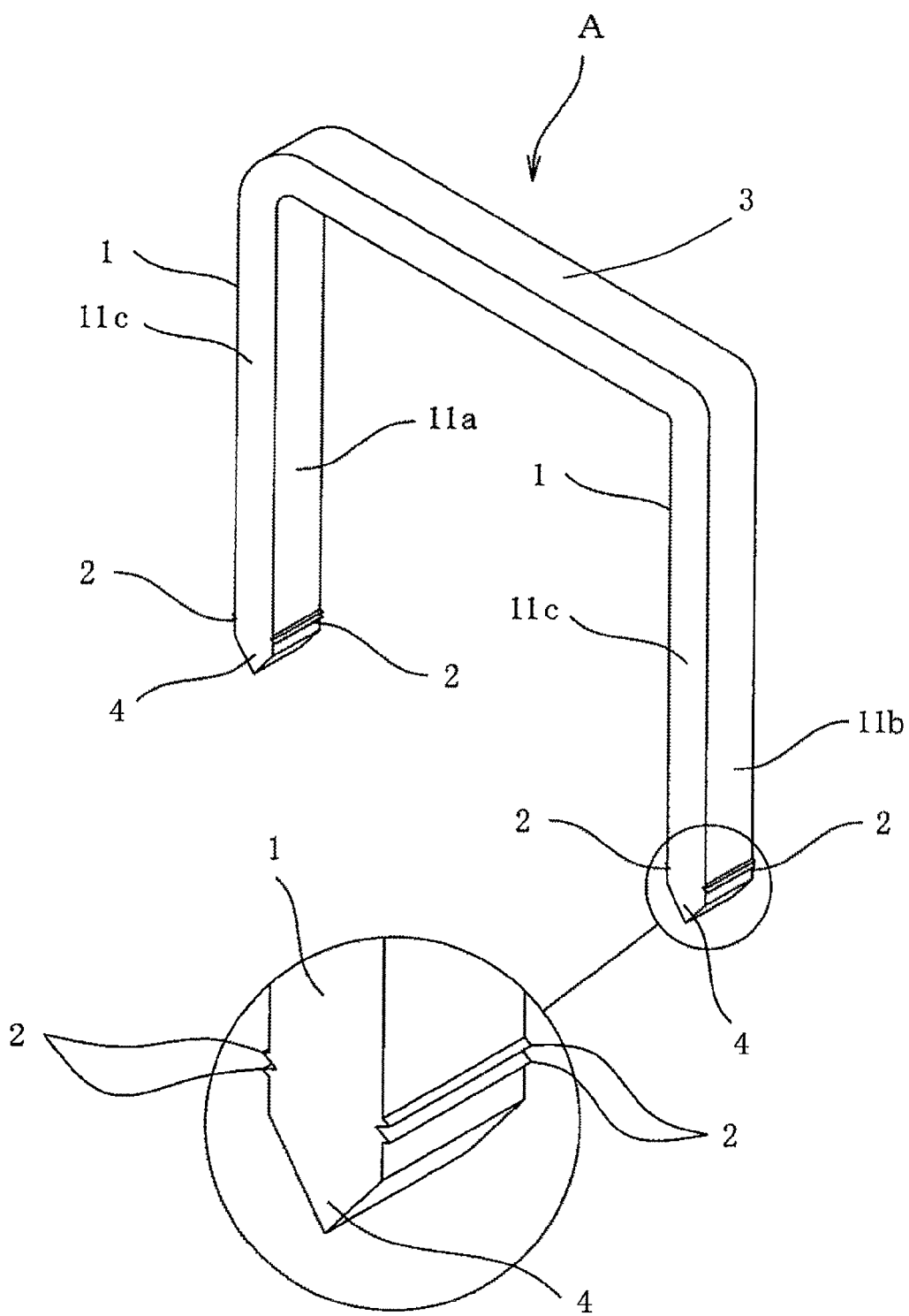
FIG. 1 is a perspective view of a penetration load reduced staple according to an exemplary embodiment of the present invention.

A penetration load reduced staple A (hereinafter, a staple A) according to an exemplary embodiment of the present invention is used with a stapler configured to bind a plurality of sheets of paper. As shown in FIG. 1, the staple A includes a pair of leg portions 1, 1, and a crown portion 3 connecting the pair of leg portions 1, 1. A distal end portion 4 (a tapered portion) of each of the leg portions 1 is formed in a sharp-pointed manner to facilitate the penetration into the sheets of paper. The cross section of each of the leg portions 1 is substantially rectangular, and side surfaces between the crown portion 3 and the distal end portion 4 includes an inner side surface 11a, an outer side surface 11b, a front side surface 11c, and a rear side surface 11d (see FIGS. 2A and 2B). Near the distal end portion 4 of each of the leg portions 1, and on each of the inner side surface 11a and the outer side surface 11b, two protrusions 2 are formed to protrude in a direction perpendicular to the striking direction (the longitudinal direction of leg portion 1), respectively. Each of the protrusions 2 is formed along the width direction of the corresponding side surface 11a, 11b, from one side edge to the other edge of the corresponding side surface 11a, 11b, i.e. along the entire width of the corresponding side surface 11a, 11b.

Figure 2A:
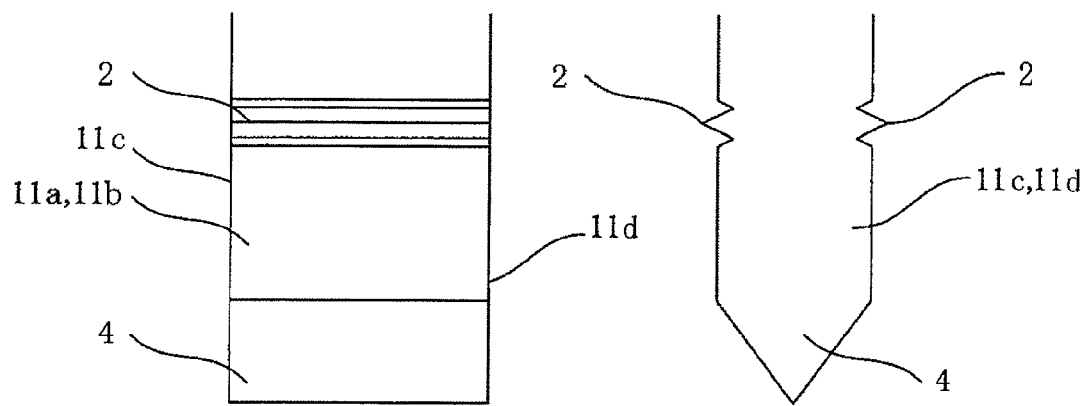
FIG. 2A is an explanatory view of another example of protrusions of the staple.
Figure 2B:
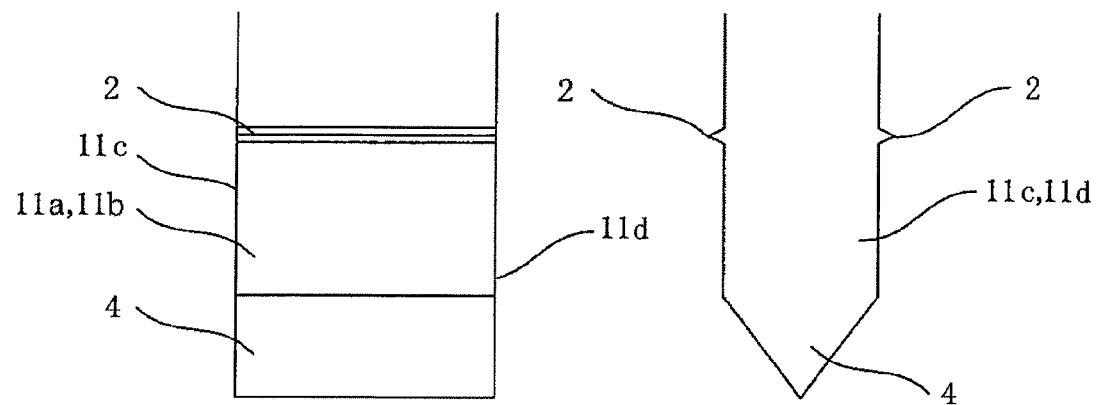
FIG. 2B is an explanatory view of yet another example of the protrusions of the staple.

The number of protrusions 2 formed on each of the side surfaces 11a, 11b of the leg portion 1 is not limited to two. For example, on each of the side surfaces 11a, 11b of the leg portion 1, one protrusion 2 may be formed as shown in FIGS. 2A and 2B, or three or more protrusions 2 may be formed. Furthermore, the protrusions 2 may be formed on one of the inner side surface 11a and the outer side surface 11b of each of the leg portions 1. Alternatively, the protrusions 2 may be formed along the entire peripheral surface of each of the leg portions 1, including the front side surface 11c and the rear side surface 11d.

The cross section of each of the leg portions 1 is not limited to the substantially rectangular shape. The protrusion 2 may be formed on at least a portion of a side surface near the distal end portion 4 of each of the leg portions 1.

It is advantageous that the cross section of each of the protrusions 2 be formed in a substantially V shape to suppress the striking load generated at the protrusion 2 when striking.

While it is advantageous that the direction in which each of the protrusions 2 protrudes from the corresponding side surface be perpendicular to the longitudinal direction of the leg portion 1, the protruding direction is not limited to the direction perpendicular to the longitudinal direction of the leg portion 1, and may be any direction intersecting the longitudinal direction of the leg portion 1.

It is advantageous that the cross sections of a portion of the leg portion 1 of the staple A other than the distal end portion 4 and the protrusions 2 have the same shape and the same size along the longitudinal direction of the leg portion 1. According to the structure, it is possible to reliably reduce the penetration resistance at the side surfaces following the protrusions 2.

Figure 3A:
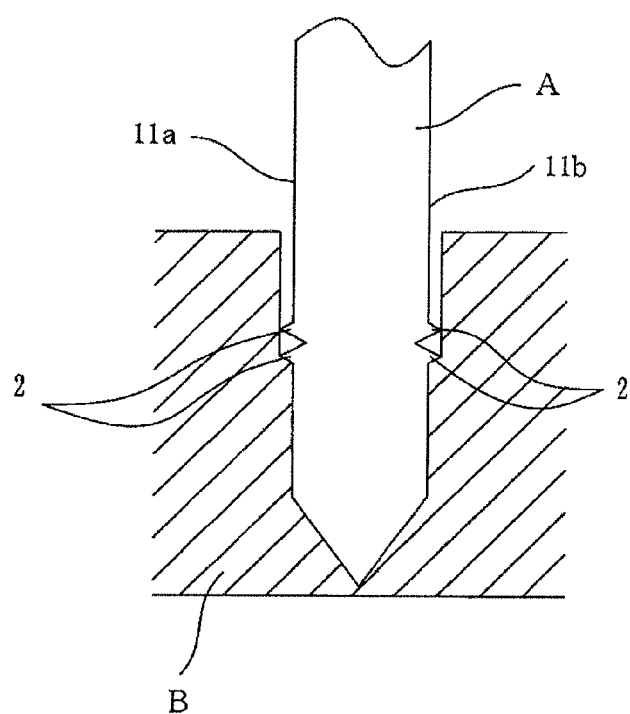
FIG. 3A is an explanatory view of a state in which the protrusions of the staple are penetrating the sheets of paper to be stapled.
Figure 3B:
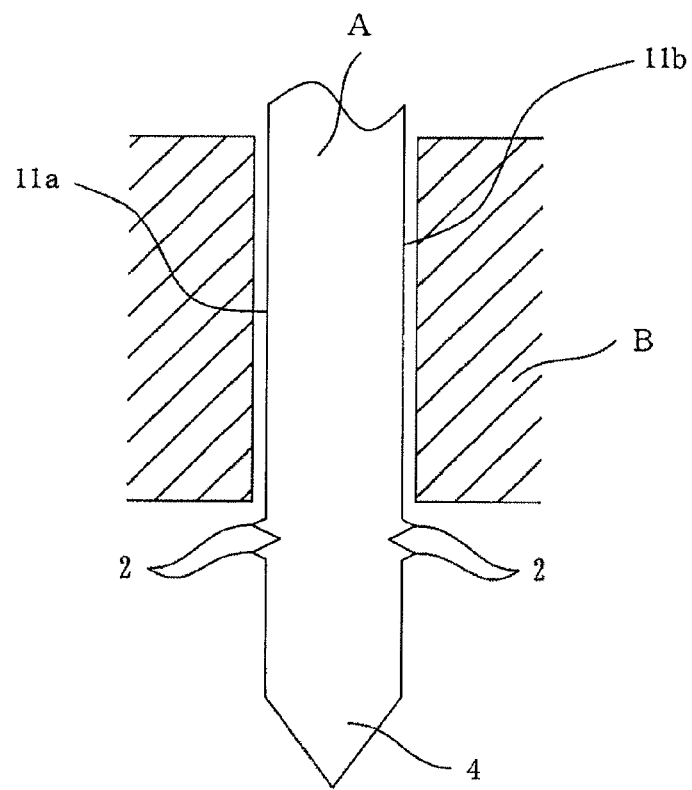
FIG. 3B is an explanatory view of a state in which the protrusions of the staple have penetrated the sheets of paper.

According to the staple A having the structure described above, when the leg portions 1 are struck into the sheets of paper B to be stapled, as shown in FIG. 3A, the penetration load temporarily increases when the protrusions 2 near the distal end portion 4 of each of the leg portions 1 passes through the sheets of paper B. However, as shown in FIG. 3B, the friction between the sheets of paper B and the inner and outer side surfaces 11a, 11b of leg portion 1 following the protrusions 2 is reduced. That is, according to a general staple, the entire side surfaces of each of the leg portions receive the penetration resistance during the penetration of the leg portion. In contrast, according to the staple A, while the penetration resistance that the protrusions 2 receive is relatively large, the penetration resistance that the inner and outer side surfaces 11a, 11b following the protrusions 2 receive becomes small. And after the protrusions 2 of the leg portion 1 have penetrated through the sheets of paper B, the penetration resistance that the leg portion 1 receives is maintained as the reduced resistance, so that the leg portion 1 is easily struck with a small power.

Further, because the protrusions 2 are formed along the entire width of the inner and outer side surfaces 11a, 11b, the penetration load that the entire inner and outer side surfaces 11a, 11b formed with the protrusions 2 receive is reduced.

Figure 7A:
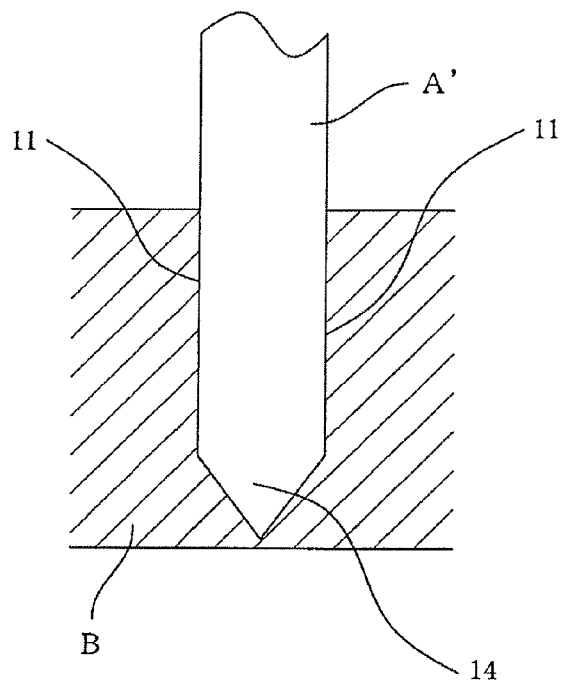
FIG. 7A is an explanatory view of a state in which a distal end portion of a conventional staple is penetrating the sheets of paper to be stapled.
Figure 7B:
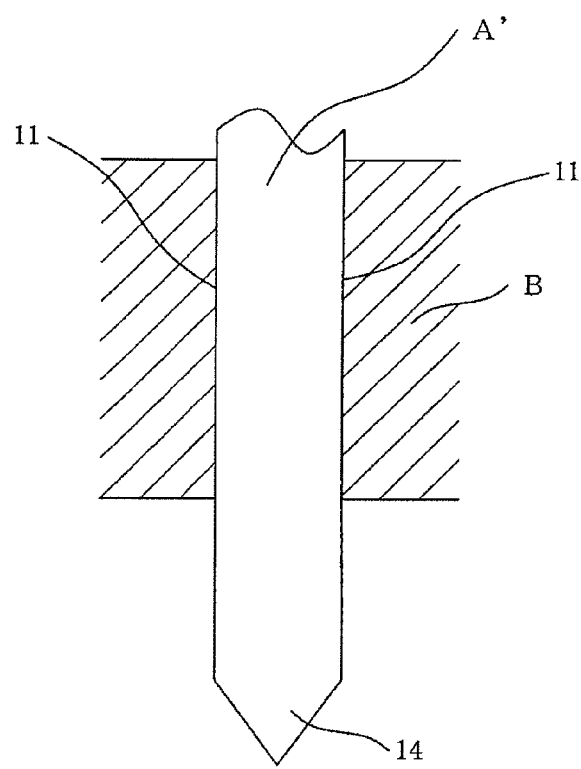
FIG. 7B is an explanatory view of a state in which the distal end portion of the conventional staple has penetrated the sheets of paper.

In contrast, in the case of a conventional staple A', as shown in FIGS. 7A and 7B, as the penetration amount of the staple A' increases, the area of side surfaces 11 that contacts the sheets of paper B increases. Therefore, the resistance that the side surfaces 11 receive sharply increases until the distal end portion 14 penetrates through the sheets of paper B. Further, even after the distal end portion 14 has penetrated through the sheets of paper B, the side surface 11 continuously receives the increased resistance.

Figure 4A:
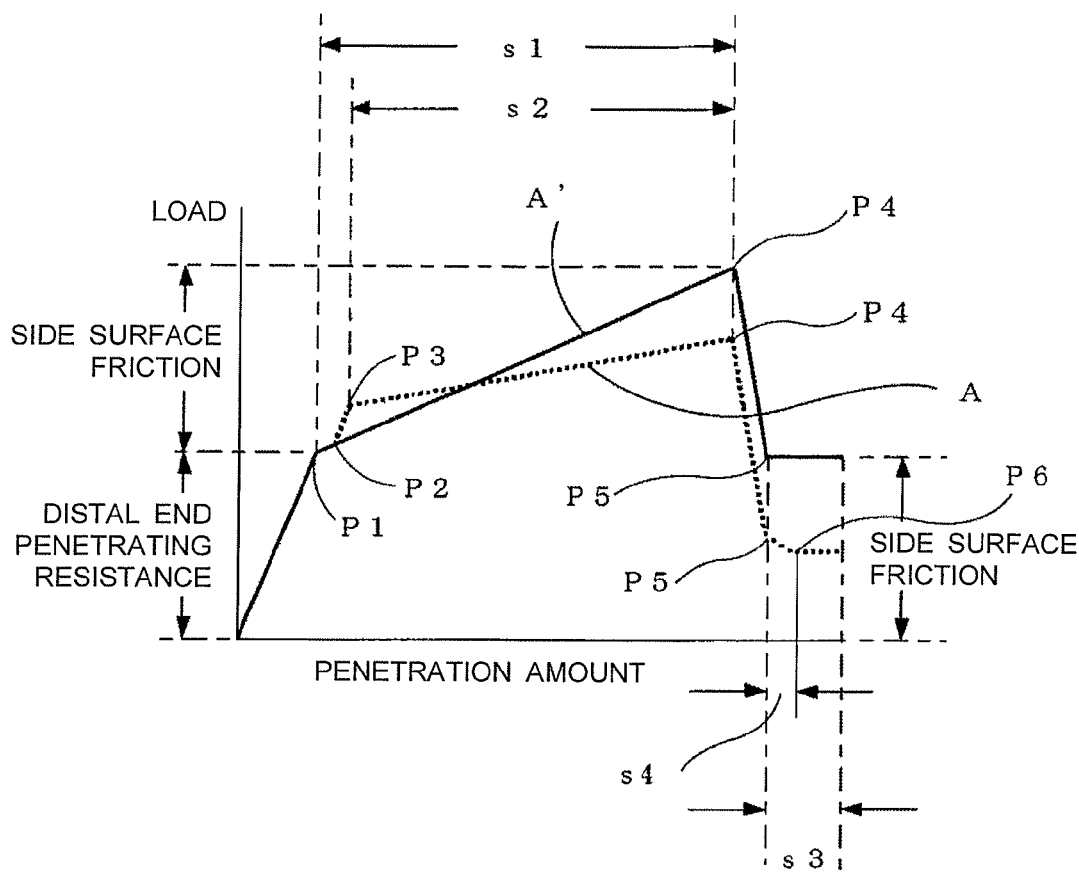
FIG. 4A is a graph schematically illustrating a relationship between a penetration amount of the staple and a striking load.

FIG. 4A is a graph illustrating the relationship between the penetration amount of the staple and the striking load. In FIG. 4A, P1 to P6 denotes the following time points, respectively.

P1: When the tapered portions (the distal end portions) of the staple have completely entered the sheets of paper
P2: When the protrusions start to enter the sheets of paper
P3: When the protrusions have completely entered sheets of paper
P4: When the tapered portions start to penetrate out from the sheets of paper
P5: When the tapered portion have penetrated out from the sheets of paper
P6: When the protrusions have penetrated out from the sheets of paper As shown in FIG. 4A, in the case of the conventional staple A', once the distal end portions 14 have entered the sheets of paper B to be stapled, the area of the side surfaces 11 that contacts the sheets of paper B increases. Therefore, the resistance that the side surfaces 11 receive sharply increases until the distal end portions 14 start to penetrate out from the sheets of paper B (see the solid line in Section s1 from P1 to P4). Further, even after the distal end portions 14 have penetrated out from the sheets of paper B (see P5), the side surfaces 11 continuously receives the increased resistance (see the solid line in Section s3).

In contrast, in the case of the penetration load reduced staple A, when the distal end portions 4 enter the sheets of paper B, and when the protrusions 2 enter the sheets of paper B, the striking load slightly increases (see P2 and P3). However, thereafter, the inner side surface 11a and the outer side surface 11b following the protrusions 2 are not brought into strong contact with the sheets of paper B. Therefore, the resistance that the entire side surfaces receive does not largely increase (see the broken line in Section s2, P3, and P4), as compared to the case of the conventional staple A'. Further, once the distal end portions 4 have penetrated out from the sheets of paper B (see P5 on the broken line extending from the broken line of Section s2), and the protrusions 2 have also penetrated out from the sheets of paper B (see P6 on the broken line in Section s4), the friction of the inner side surface 11a and the outer side surface 11b of the leg portion 1 with the sheets of paper B is reduced, so that the resistance that the entire side surfaces receive remarkably decreases (see the broken line in Section s3).

Figure 4B:
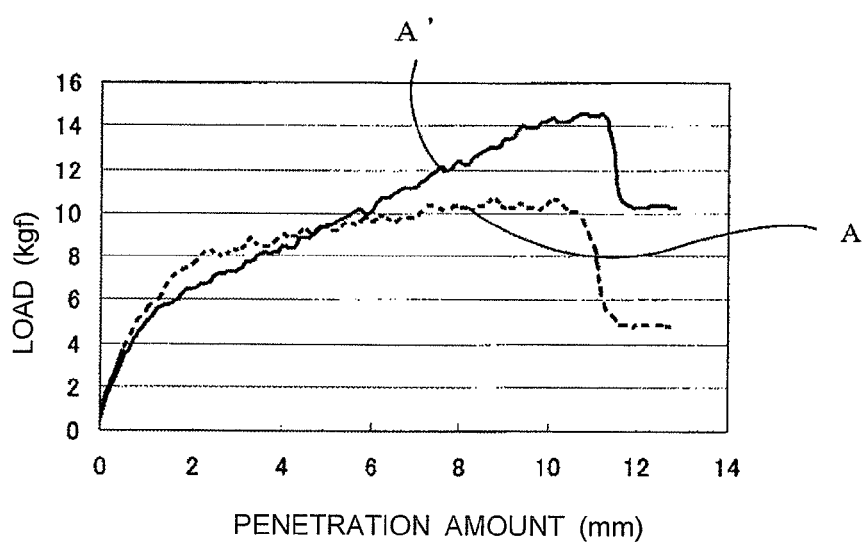
FIG. 4B is a graph illustrating a relationship between the penetration amount and of the staple the striking load, based on actually measured values.

FIG. 4B is a graph illustrating the relationship between the penetration amount of the staple and the striking load, based on the actually measured values when the staple is struck into the sheets of paper B consisting of eighty sheets of POD coated 128 gsm paper. The solid line shows the actually measured values when the conventional staple A' is used, and the broken line shows the actually measured values when the penetration load reduced staple A shown in FIG. 1 is used.

Figure 5A:
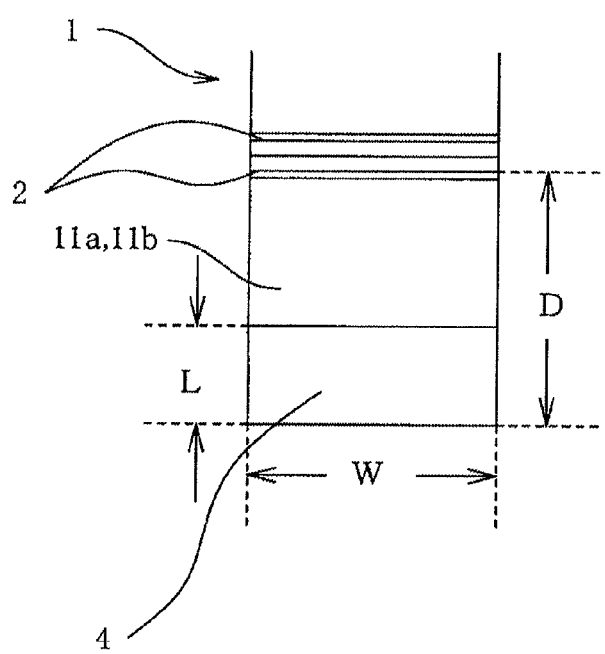
FIG. 5A is a side view of a leg portion of the staple.
Figure 5B:
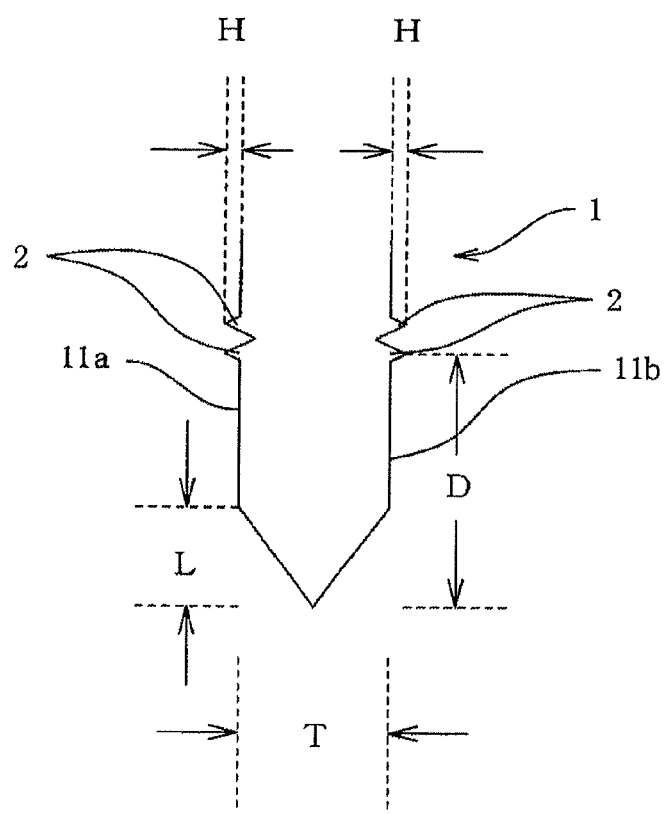
FIG. 5B is a front view of the leg portion of the staple.

As shown in FIGS. 5A and 5B, for example, the staple A may be formed such that, when the width W of the leg portion 1 is 0.5 mm and the thickness T of the leg portion 1 is 0.35 mm, the length L of the distal end portion 4 is about 0.2 mm and the distance D from the distal end to the protrusions 2 is about 0.3 mm to 1.6 mm. In this way, the protrusions 2 are formed near the distal end portion 4 of the leg portion 1 to reduce the penetration resistance as soon as possible after the distal end portion 4 has entered the sheets of paper B. It is advantageous that each of the protrusions 2 be formed to have a protruding height H of about 0.01 mm to 0.03 mm from the corresponding side surface of the leg portion 1. This is because, when the protruding height H of each of the protrusions 2 is larger than 0.03 mm, the penetration resistance that the protrusions 2 receive becomes excessively large, and an excessive room is provided between the leg portion 1 and the through hole in the sheets of paper B after the protrusions 2 have penetrated out from the sheets of paper B, resulting in an unstable stapled condition. When the protruding height H of each of the protrusions 2 is smaller than 0.01 mm, it is difficult to obtain the penetration resistance reducing effect by the protrusions 2.

As described above, the penetration load reduced staple A can penetrate through and bind sheets of paper having a high penetration resistance without buckling, using an existing stapler, and without need for a support member to prevent buckling of a staple or a penetration resistance reducing agent or the like for reducing the penetration resistance. Further, since the penetration load is reduced as a whole by a simple structure in which the protrusions 2 are formed on the side surfaces of the leg portions 1 of the staple A, it is possible to penetrate through and bind sheets of paper having a high penetrate resistance without strengthening the stiffness or the power of the stapler. Therefore, the size of the stapler does not need to be increased, and the energy saving can be maintained.

Figure 6:
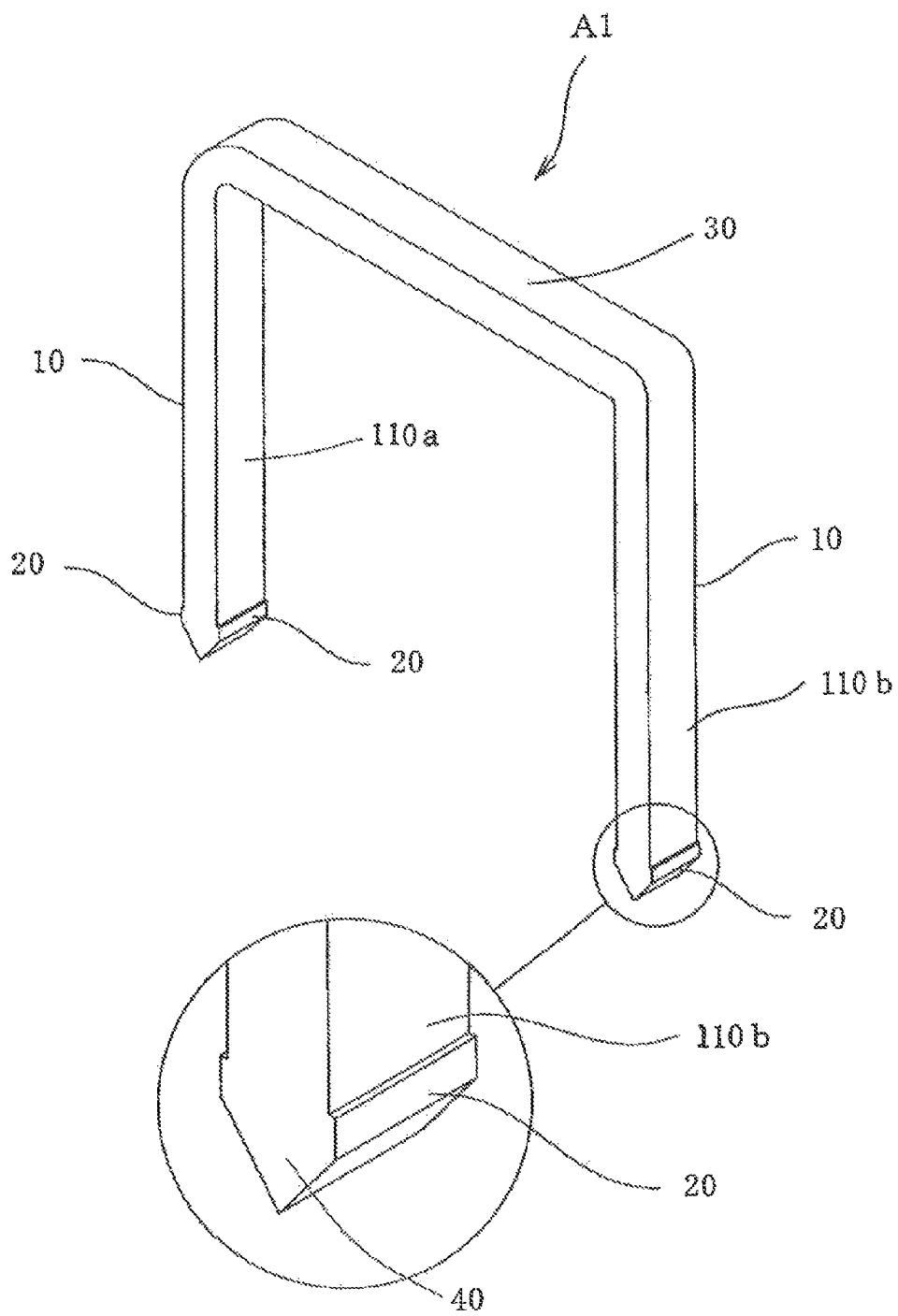
FIG. 6 is a perspective view of a penetration load reduced staple according to another exemplary embodiment of the present invention.

FIG. 6 shows a penetration load reduced staple A1 according to another exemplary embodiment of the present invention. This penetration load reduced staple A1 is formed such that the portions of the leg portions 10 adjacent to the distal end portions 40 are thicker than the other portions of the leg portions 10 closer to the crown portion 30. Accordingly, stepped portions 20 (protrusions) are formed on the portions of the inner side surface 110a and the outer side surface 110b of the leg portions 10 (may be one of the inner side surface 110a and the outer side surface 110b) adjacent to the distal end portions 40, protruding in a direction perpendicular to the striking direction. Therefore, once the stepped portions 20 have penetrated out from the sheets of paper to be stapled, the resistance that the side surfaces of the leg portions 10 receive from the sheets of paper is reduced, and thus, it is possible to obtain similar advantageous effect as the penetration load reduced staple A described above.

While the exemplary embodiments of the present invention have been described above, those skilled in the art will understand that various changes and modifications can be made therein without departing from the spirit and scope of the present invention The present application is based on the Japanese Patent Application No. 2008-330606 filed on Dec. 25, 2008, the content of which is incorporated herein by reference.

The invention claimed is:

1. A penetration load reduced staple for use with a stapler configured to bind a plurality of sheets of paper, the penetration load reduced staple comprising:
    a pair of leg portions configured to penetrate the sheets of paper;
    a distal end portion formed at a distal end of each leg portion, each distal end portion comprising a tapered portion of the respective leg portion forming an apex; and
    a crown portion connecting the pair of leg portions,
    wherein each of the leg portions comprises a first protrusion protruding in a first direction intersecting with a longitudinal direction of the leg portion and a second protrusion protruding in a second direction intersecting with the longitudinal direction of the leg portion, the first protrusion protruding from a portion of an inner side surface of the leg portion between the crown portion and the distal end portion of the leg portion and near the distal end portion such that the inner side surface extends along the longitudinal direction of the leg portion between the tapered portion and the first protrusion and between the first protrusion and the crown portion, the second protrusion protruding from a portion of an outer side surface of the leg portion between the crown portion and the distal end portion and near the distal end portion such that the outer side surface extends along the longitudinal direction of the leg portion between the tapered portion and the second protrusion and between the second protrusion and the crown portion,
    wherein a protruding height of the first protrusion from the inner side surface and a protruding height of the second protrusion from the outer side surface are 0.01 mm to 0.03 mm.

2. The penetration load reduced staple according to claim 1, wherein a cross section of a portion of each of the leg portions other than the distal end portion and the first and second protrusions has a same shape and a same size along the longitudinal direction of the leg portion.

3. The penetration load reduced staple according to claim 1, wherein the first protrusion is formed along the entire width of the inner side surface, and the second protrusion is formed along the entire width of the outer side surface.

4. The penetration load reduced staple according to claim 1, wherein each of the leg portions has a substantially rectangular cross section.

5. The penetration load reduced staple according to claim 1, wherein each of the first and second protrusions has a V shape.

* * * * *